(12) United States Patent
Mäkelä

(10) Patent No.: US 8,302,029 B2
(45) Date of Patent: Oct. 30, 2012

(54) PRESENTATION OF LARGE OBJECTS ON SMALL DISPLAYS

(75) Inventor: Mikko Kalervo Mäkelä, Tampere (FI)

(73) Assignee: Nokia Corporation, Espoo (FI)

( * ) Notice: Subject to any disclaimer, the term of this patent is extended or adjusted under 35 U.S.C. 154(b) by 962 days.

(21) Appl. No.: 12/152,270

(22) Filed: May 12, 2008

(65) Prior Publication Data

US 2009/0089704 A1 Apr. 2, 2009

Related U.S. Application Data

(63) Continuation of application No. 10/573,432, filed as application No. PCT/IB2004/003073 on Sep. 21, 2004, now abandoned, which is a continuation-in-part of application No. 10/820,442, filed on Apr. 7, 2004.

(51) Int. Cl.
*G06F 3/48* (2006.01)
*G06F 3/00* (2006.01)
*G06F 3/14* (2006.01)
*G06F 17/02* (2006.01)

(52) U.S. Cl. ........ 715/800; 715/764; 715/500; 715/864; 715/792; 715/201; 715/781; 345/619; 345/629

(58) Field of Classification Search ................. 715/792, 715/201, 500, 764, 864, 800; 345/619, 629
See application file for complete search history.

(56) References Cited

U.S. PATENT DOCUMENTS

| 5,448,696 A | * | 9/1995 | Shimada et al. | 715/853 |
| 5,537,520 A | * | 7/1996 | Doi et al. | 345/422 |
| 5,786,907 A | * | 7/1998 | Lotspiech | 358/518 |
| 5,920,315 A | * | 7/1999 | Santos-Gomez | 715/792 |
| 6,172,685 B1 | | 1/2001 | Pandit | 345/471 |
| 6,222,583 B1 | * | 4/2001 | Matsumura et al. | 348/113 |
| 6,268,935 B1 | * | 7/2001 | Kingetsu et al. | 358/2.1 |
| 6,289,361 B1 | * | 9/2001 | Uchida | 715/201 |

(Continued)

FOREIGN PATENT DOCUMENTS

CA 02514655 * 9/2008

(Continued)

OTHER PUBLICATIONS

Chen et al., Detecting Web Page Structure for Adaptive Viewing on Small Form Factor Devices, May 2003, Budapest, Hungary.*

(Continued)

*Primary Examiner* — Boris Pesin
*Assistant Examiner* — Ece Hur
(74) *Attorney, Agent, or Firm* — Alston & Bird LLP

(57) ABSTRACT

A method for presenting at least a part of an object is shown, including at least partially dividing at least one object into a plurality of sub-objects, presenting the plurality of sub-objects in a first representation, making at least one sub-object of the plurality of sub-objects an active sub-object, and in response to a user operation on the at least one active sub-object, presenting at least one of the at least one active sub-objects in a second representation. The at least one object may be a 2D object, e.g. a Hypertext Markup Language HTML page or a page of a text document, or a 3D object, e.g. a Virtual Reality Markup Language VRML object, and the display may be integrated in a portable electronic device. A device, a system, a computer program and a computer program product for performing such methods are also provided.

22 Claims, 11 Drawing Sheets

U.S. PATENT DOCUMENTS

| | | | |
|---|---|---|---|
| 6,300,947 B1* | 10/2001 | Kanevsky | 715/866 |
| 6,304,855 B1* | 10/2001 | Burke | 705/26.9 |
| 6,593,944 B1 | 7/2003 | Nicolas et al. | |
| 6,744,380 B2* | 6/2004 | Imanishi et al. | 340/937 |
| 6,775,742 B2 | 8/2004 | Huffman et al. | |
| 6,795,795 B2* | 9/2004 | Kreichauf | 702/181 |
| 6,834,306 B1* | 12/2004 | Tsimelzon | 709/228 |
| 6,857,102 B1 | 2/2005 | Bickmore et al. | |
| 6,990,228 B1* | 1/2006 | Wiles et al. | 382/154 |
| 7,240,294 B2* | 7/2007 | Fitzsimons et al. | 715/788 |
| 7,324,113 B1* | 1/2008 | Rouet et al. | 345/522 |
| 7,346,856 B2* | 3/2008 | Nguyen et al. | 715/800 |
| 7,667,581 B2* | 2/2010 | Fujimoto | 340/436 |
| 8,135,240 B2* | 3/2012 | Satoh | 382/305 |
| 2002/0030699 A1* | 3/2002 | Van Ee | 345/810 |
| 2002/0158908 A1* | 10/2002 | Vaajala et al. | 345/767 |
| 2002/0191031 A1 | 12/2002 | Ricard | |
| 2004/0103371 A1* | 5/2004 | Chen et al. | 715/513 |
| 2005/0041858 A1* | 2/2005 | Celi et al. | 382/173 |
| 2006/0136839 A1* | 6/2006 | Makela | 715/786 |
| 2006/0288280 A1* | 12/2006 | Makela | 715/530 |
| 2007/0110037 A1* | 5/2007 | Shin | 370/352 |
| 2007/0124669 A1* | 5/2007 | Makela | 715/520 |
| 2009/0060393 A1* | 3/2009 | Satoh | 382/305 |
| 2010/0225740 A1* | 9/2010 | Jung et al. | 348/42 |

FOREIGN PATENT DOCUMENTS

| | | | |
|---|---|---|---|
| EP | 1253510 | * | 20/2002 |
| EP | 0 949 571 | | 10/1999 |
| EP | 1 253 510 | | 10/2002 |
| WO | WO 01/11503 A2 | | 2/2001 |
| WO | WO 01/65377 | | 9/2001 |
| WO | WO 02/08910 | | 1/2002 |
| WO | 2004/023450 | | 3/2004 |
| WO | WO2004/023450 | * | 3/2004 |

OTHER PUBLICATIONS

Yin et al., "Optimization of web page for mobile devices", 2004, pp. 1-9.*

Patent Abstracts of Japan, Japanese Publication No. 2000-076473 published Mar. 14, 2000 (1 page).

Patent Abstracts of Japan, Japanese Publication No. 2002-007269 published Jan. 11, 2002 (1 page).

Patent Abstracts of Japan, Japanese Publication No. 2002-175135 published Jun. 21, 2002 (1 page).

Patent Abstracts of Japan, Japanese Publication No. 10-222143 published Aug. 21, 1998 (1 page).

Patent Abstracts of Japan, Japanese Publication No. 2003-141022 published May 16, 2003 (1 page).

English-language translation of Japanese Office Action dated Jun. 24, 2008 issued in corresponding JP application (3 pages).

Machine translation of JP Publication No. 2002-007269 published Jan. 11, 2002 (8 pages).

Machine translation of JP Publication No. 2002-175135 published Jun. 21, 2002 (10 pages).

Machine translation of JP Publication No. 2003-141022 published May 16, 2003 (19 pages).

Chen, Yu et al., "*Detecting Web Page Structure for Adaptive Viewing on Small Form Factor Devices*," Proceedings of the 12th International Conference on World Wide Web (WWW 2003), May 20-24, 2003, Budapest, Hungary (9 pages).

"WEST: a Web Browser for Small Terminals" by Bjork et al, UIST. Proceedings of the Annual ACM Symposium on User Interface Software and Technology, vol. 1, No. 1, 1999, pp. 187-196.

Office Action for Canadian Application No. 2,537,100 dated May 4, 2010.

* cited by examiner

| Type | Dimensions | Engine | Performance |
|---|---|---|---|
| 105 | 106 | 107 | 108 |
| 109 | 110 | 111 | 112 |
| 113 | 114 | 115 | 116 |

Fig.3

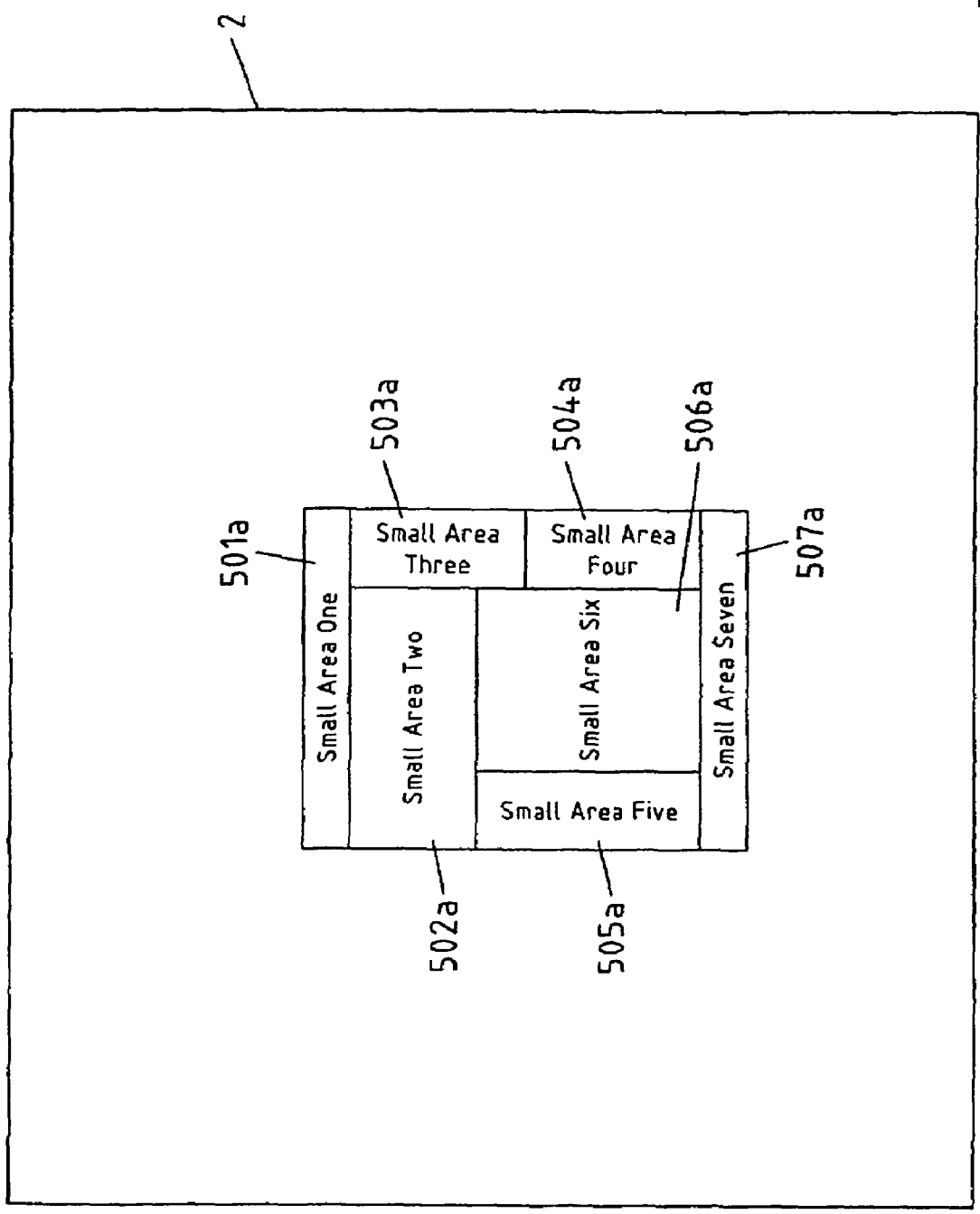

PRESENTATION OF LARGE OBJECTS ON SMALL DISPLAYS

CROSS-REFERENCE TO RELATED APPLICATIONS

This application is a continuation of U.S. application Ser. No. 10/573,432 filed Nov. 6, 2006, now abandoned which is the U.S. National Stage of International Application No. PCT/IB2004/003073 filed Sep. 21, 2004 which is a continuation-in-part of U.S. application Ser. No. 10/820,442 filed Apr. 7, 2004.

FIELD OF THE INVENTION

This invention relates to a method, a computer program, a computer program product, a device and a system for presenting at least a part of an object on a display.

BACKGROUND OF THE INVENTION

The ongoing miniaturization of multi-media devices such as Personal Digital Assistants (PDAs) or mobile phones in recent years appears to be only bounded by the perceptual limits of the human user. This particularly applies to the design of the displays of multimedia devices, with a remarkable trend to increase the relative area of the device that is consumed by its display. However, the display sizes of, for example, hand-held devices are necessarily significantly smaller than the display sizes, for which content is usually designed. If for instance content of the World Wide Web (WWW), i.e. web pages formatted according to the Hypertext Markup Language (HTML) or derivatives thereof (such as Extensible HTML (XHTML)), is to be displayed on the display of a hand-held device, it has to be considered that these web pages normally have an original presentation size designed for portrayal on a computer monitor, the dimensions of which are often remarkably larger than the display dimensions of a hand-held device such as a mobile phone.

Viewing web pages on a small display requires horizontal and vertical scrolling with scroll bars, which is generally experienced as uncomfortable or even annoying for the user.

Consequently, most browsers that are installed in, for example, hand-held devices and provide for the interpretation of the web page content offer the possibility to view web pages in a format that is optimized for the display dimensions of the hand-held device. This is usually achieved by rendering the web page so that it fits the width of the device's display.

This method of rendering the page so that it fits the width of the device's display causes at least the following problems:

Rendered pages get very tall, so a lot of vertical scrolling is required.

The structure of the web page is not preserved well by the rendering process, for example form elements like input fields frequently get separated far away from each other if they are aligned using tables.

An original layout mode is required as an additional viewing method, as all the pages just do not convert usably into tall and narrow format.

In said original layout mode, the web page is displayed in its original presentation size, i.e. a size wherein objects of said web page have the size that is prescribed by the object format (e.g. image or text format) and/or the markup language. Even when such an original layout mode is provided by the browser, there arise further problems:

As the web page area is big, a lot of panning and zooming is needed to explore the entire content of the web page.

On a small display, it is difficult to figure out the structure of a large page, i.e. the viewer may lose an overview of the entire web page.

Text paragraphs in the original layout usually are wider than the display width, so that paragraphs in the original layout mode on a small display are often difficult to read.

Quite similar problems are encountered when instead of two-dimensional (2D) objects (such as pages), three-dimensional (3D) objects are to be presented on a display. Examples of such 3D objects are a 3D map of a town, for instance obeying the Virtual Reality Markup Language (VRML), or a 3D calendar representation, wherein days, weeks, months or years may be represented by cubes that are accordingly positioned to each other. There currently exists no technique to clearly present such usually large 3D objects on a small display.

SUMMARY OF THE INVENTION

In view of the above-mentioned problems, it is, inter alia, an object of the present invention to provide a method, a computer program, a computer program product, a device and a system for an improved presentation of large objects on small displays.

A method is proposed for presenting at least a part of an object, comprising at least partially dividing at least one object into a plurality of sub-objects, presenting said plurality of sub-objects in a first representation, making at least one sub-object of said plurality of sub-objects an active sub-object; and in response to a user operation on said at least one active sub-object, presenting at least one of said at least one active sub-objects in a second representation.

Said at least one object comprises content that may be structured or organized, for instance, the object may contain pictures, tables, text paragraphs, forms, 3D blocks, or similar elements. The layout and size of said at least one object may be optimized for portrayal on a computer monitor or television screen. To allow for a presentation of at least a part of said at least one object, for instance for a displaying on a display the dimensions of which, such as display diagonal or height and width of the display, may be substantially smaller than those of a computer monitor or television screen, said at least one object is at least partially divided into a plurality of sub-objects. For instance, if said at least one object is structured as a table, the cells of the table may represent said sub-objects, and/or if the at least one object contains pictures, said pictures may represent said sub-objects.

Said at least one object is at least partially divided into said plurality of sub-objects. Thus either the complete object, or only a part thereof may be divided into sub-objects. In case of several objects, said objects may be completely divided into sub-objects or only parts of each object may be divided into sub-objects. Said parts may be the same for said objects, for instance only a center region or the content of a specific frame on each object, or said parts of said objects may be different.

Said at least one object may be divided into different types of sub-objects, wherein each type may for instance be characterized by a different degree of detail, a different size or a different appearance, and wherein sub-objects of different types maybe associated with each other. Said object may for instance be a map of a town, and then a first type of sub-objects may be buildings of said town, and a second type of sub-objects may be rooms of the buildings, wherein the rooms then may be associated with the buildings. The plurality of sub-objects then may have a hierarchical structure.

According to the present invention, it is also possible that several objects are at least partially divided into sub-objects.

These several objects may for instance be pages of a text document, slides of a presentation, several web pages, several 3D objects or any other accumulation of information-carrying objects. When dividing said several objects into sub-objects, not necessarily each sub-object corresponds to one object. For instance, several objects may correspond to a sub-object, or only parts of an object may correspond to a sub-object. At least partially dividing several objects into sub-objects that are presented in a first representation and then, upon user operation, at least partially in a second representation allows the user to comfortably gain an overview on information that is spread across several objects and thus naturally difficult to perceive.

Said plurality of sub-objects is then presented in a first representation. This may for instance be a small representation, i.e. the size of said sub-objects may be reduced as compared to their original presentation size, wherein said original presentation size of said sub-object depends on the original presentation size of said at least one object said sub-object is a part of. Said original presentation size of said at least one object may for instance be the size of said at least one object as prescribed by a format of said object, for instance a 2D or 3D image or text format or a markup language, and may for instance be defined in units of pixels or inches. In said first representation, said sub-objects of said plurality of sub-objects may, for instance, be scaled to a smaller size by reducing the height and/or width and/or depth of the original presentation size of said sub-object, or may be cropped by cutting off parts of said sub-object and displaying the remaining part, for instance, the content in the upper left corner of a 2D sub-object, or may be indicated by an icon, for instance, an icon symbolizing an image or an input field. For different sub-objects of said plurality of sub-objects, different size reduction techniques such as scaling, cropping, using icons or any combination of them may be used. Said first representation may also comprise total skipping of sub-objects of a object, if said sub-objects are decided to contain no relevant information, or if it is desired to remove advertisements or other unwanted content. In said first representation, the actual content of said sub-objects in first representation may no longer be clearly distinguishable. However, active elements such as hyperlinks, animated images, forms or similar elements within said sub-objects may still properly work in said first representation (or at least be recognizable).

With said plurality of sub-objects being presented in first representation, it may be possible to reduce the original presentation size of the at least one object down to a size that lends itself for portrayal on a small display. However, even in this first representation, 1D, 2D or 3D scrolling may be required (in one, two or three dimensions of a Cartesian or spherical coordinate system, respectively) to explore sub-objects of said plurality of sub-objects in said first representation. Even when the content of one or more sub-objects in said first representation may no longer be clearly visible, a viewer gets an overview on the structure and contents of the at least one object, wherein the required amount of 1D, 2D or 3D scrolling may be eliminated or at least reduced. The same holds for the presentation of more than one object by dividing the objects into sub-objects and displaying said sub-objects in a first and a second representation, which allows the user to gain a structured overview on information that is spread across several objects.

When presenting said plurality of sub-objects in said first representation, at least one of said sub-objects is made an active sub-object, i.e. it may, for instance, be made selectable, for instance by a viewer or by a browser. Said user operation on said at least one active sub-object then would be a selection, and said at least one active sub-object being selected then becomes a selected sub-object.

Prior to said selection, said at least one active sub-object may be focused. Focusing may be implemented in a way that an accentuation can be navigated among said active sub-objects, for instance, via a cursor, and by pressing a key or a button, the active sub-object that is currently accentuated/focused, is selected. As an alternative for selection, each active sub-object may be assigned a number, letter or symbol, and the active sub-object then can be selected by pressing a key with the corresponding number, letter or symbol or entering a command into a user interface. Further alternatively, said selection may be accomplished via tipping on the active sub-object with a stylus or a finger on a touch-screen display, or with a mouse pointer, if mouse functionality is provided in a device, or via eye tracking, voice control or similar non-contact techniques that allow for an identification of selected sub-objects. In this case, said user interaction then may only be an eye movement or a spoken word.

Said selection may also be automatically accomplished by a device or application, based on pre-defined selection information, for instance a sub-object that contains new content or a sub-object that contains a form may be automatically selected or alternatively, said active sub-object may be automatically highlighted, for example, by placing a focus or cursor onto it, but not automatically selected.

At least one of said at least one active sub-objects is then presented in a second representation. If said user operation is a selection of said at least one active sub-object, said at least one active sub-object presented in said second representation then corresponds to said selected sub-object. In said second representation, which may, for instance, be a large representation, said selected sub-object may be scaled to a larger format than in said first representation, or may be less cropped, or both, so that its content may be more properly inspected and used. If said selected sub-object is indicated by an icon in said first representation, in said second representation its actual content may be presented. In said second representation, said selected sub-object may be scaled to fit at least one dimension of a display, for instance the width of the display (scaling may also be done so that e.g. text is shown in its full presentation size but forced to wrap to display width), or it may be scaled to its original presentation size (possibly so that all text inside a sub-object is forced to wrap to the display width and is, for example, left aligned). However, scrolling may still be required to entirely view the selected sub-object in said second representation. In said second representation, said selected sub-object may be presented alone, or together with neighboring sub-objects, wherein active neighboring sub-objects or both active and non-active neighboring sub-objects may be presented. Scrolling from said selected sub-object to said neighboring sub-objects may be possible by interaction of the viewer or browser. Said at least one selected sub-object and possibly said neighboring sub-objects in said second representation, and sub-objects in said first representation may well be presented at the same time. For instance, when said plurality of sub-objects in said first representation is presented, the selection of an active sub-object may cause an enlargement of the selected sub-object, wherein said selected sub-object then is displayed in said second representation, together with the plurality of sub-objects in said first representation, but possibly without the first representation of the selected sub-object, which now is presented in said second representation. To preserve the layout of the at least one object when mixing first and second representations, it may be advantageous that sub-objects that are at least partially at the same height or width or depth as the selected sub-object, for instance, in the same row or column in a 2D table layout, are also displayed in second representation, wherein their up-scaling then depends on the size or scaling of the selected sub-object in said second representation. For these sub-objects on the same height/width/depth, enlarging may also be done in one dimension, for example increasing only the width of sub-objects above/below the selected sub-object. By de-selecting said selected sub-object, said plurality of sub-objects is then presented in said first representation again, and a different active sub-object may be selected for closer inspection. When one active sub-object is selected, the user may scroll a display on which said active sub-object is presented, so that one or more of the neighboring sub-objects become visible, wherein these neighboring sub-objects may be in first or second representation. The user may then directly select any of the neighboring sub-objects, and after selection, the new selected sub-object is shown in second representation and other sub-objects (including the sub-object that was previously shown in second representation) are shown in first representation.

Alternatively, it is possible that when selecting a neighboring sub-object, both the neighboring sub-object and a previously selected sub-object are shown in second representation. In this way the user can choose more than one sub-object to be shown in second representation at a time. The user can also de-select sub-objects one by one to return them to be shown in first representation.

The present invention obviously allows for an improved presentation of large objects on small displays by breaking down at least one object into a plurality of sub-objects, which are presented in a clear first representation that may grant the viewer an overview on the structure of the at least one object, and, via the possibility to select active sub-objects in said first representation via user operation and then to view said selected sub-objects in a second representation, also may allow to present relevant sub-objects of the at least one object in adequate size. In contrast to state-of-the-art techniques, it may be possible to skip the necessity of a complex original layout mode. The amount of scrolling, panning and zooming required to get an overview on the at least one object and to explore its content can be significantly reduced, so that less user interaction is needed and one-hand usage is facilitated.

According to a method of the present invention, said at least one object and said sub-objects are 3D-objects. Said at least one object may for instance be a 3D map, which may for instance obey the Virtual Reality Markup Language (VRML), or a 3D calendar, or any other information that is presented under exploitation of the third spatial dimension. If said 3D object is a 3D map of a town, said sub-objects may for instance be blocks or buildings of said town, and if said 3D object is a building, said sub-objects may for instance be rooms of said building. If 3D objects are to be displayed, said display may be a special display that is particularly suited for the portrayal of 3D objects, for instance a 3D display, or a standard display.

According to a method of the present invention, said at least one object is a page, and said sub-objects are areas. Said at least one object and said sub-objects then are 2D objects. Said page may for instance be a page of a text document, a slide of a presentation, or a web page.

According to a method of the present invention, in said user operation, at least one of said at least one active sub-objects is selected, and wherein at least said selected sub-object is presented in said second representation.

According to a method of the present invention, at least two sub-objects of said plurality of sub-objects are made active sub-objects. Then the viewer may select at least one of said two active sub-objects to be presented in said second representation.

According to a method of the present invention, said at least partial division of said at least one object into said plurality of sub-objects is based on a structure of at least a part of said at least one object. Said structure may be based on the appearance of at least a part of said at least one object, for instance, if the at least one object is a picture, which contains several elements, said elements may be assigned to respective sub-objects. In case of several objects, said structure may at least partially be based on the sequence of logical linking of said objects, so that, for instance, said several objects are divided into sub-objects in a way that each sub-object contains some consecutive objects or similar. Said structure may also be based on the format that defines the object. For instance, if the object is a web page that obeys the Hypertext Markup Language (HTML) or a similar language format, the object is inherently structured in terms of HTML elements such as for instance frames, tables, paragraphs, images and hyperlinks. HTML tags marking the beginning and the end of HTML elements may then be exploited when dividing the object into said plurality of elements. The same holds if the object is a 3D object that obeys the Virtual Reality Markup Language (VRML), for example. Said division may for instance be performed by a browser or any other application that is installed in the device or by a content optimization server in the network, i.e. a server that is located between the client and the server that provides objects. Data traffic goes through the content optimization server that may be capable of modifying objects to be better suitable for a mobile client.

According to a method of the present invention, said at least partial division of said at least one object into said plurality of sub-objects is based on a sectioning algorithm. Said sectioning algorithm may be based on pre-defined rules and perform a partial or complete division of said at least one object into a plurality of sub-objects according to these rules. If said object is an object with a hierarchical structure, said structure may be considered in said sectioning algorithm. Otherwise, said object may be divided into sub-objects of a certain size, for instance certain rectangles for 2D objects and certain parallelepipeds for 3D objects.

According to a method of the present invention, in said first representation, at least one sub-object of said plurality of sub-objects is scaled to a size that is smaller than the original presentation size of said respective sub-object. Said original presentation size of said sub-object depends on the original presentation size of said at least one object said sub-object is a part of. Said original presentation size of said at least one object may for instance be the size of said at least one object as prescribed by a format of said object, for instance a 2D or 3D image or text format or a markup language, and may for instance be defined in units of pixels or inches. Said original presentation size of said at least one object may substantially differ from the original size of the content of said at least one object.

For instance, if said at least one object is an image, the content (or motive) of said image may be substantially larger or smaller than its representation in said image, i.e. the image may contain a zoomed-in or zoomed-out representation of said content.

Said scaling may refer to the height, width and/or depth of said original presentation size of said sub-object. Said scaling may also comprise image processing techniques, for instance to improve the appearance of the sub-object in said first representation after the scaling, or be combined with cropping techniques. Each sub-object of said plurality of sub-objects may be subject to the same scaling, or different scaling methods and amount of scaling may be applied. For instance, if sub-objects are made active and/or focused in said first representation, different amounts of scaling may be applied to said sub-objects in said first representation in a way that sub-objects that are in a close neighborhood of an active/focused sub-object, and said active/focused sub-object are scaled by a first scale factor, and the remaining sub-objects in said first representation are scaled by a second scale factor, wherein said first scale factor causes less down-scaling than said second scale factor. Then said active/focused sub-object and said neighboring sub-objects are presented in larger size than said remaining sub-objects. It may also be possible that the scale factor of each sub-object gradually increases or decreases with increasing distance of said respective sub-object to said active/focused sub-object.

According to a method of the present invention, in said first representation, at least one sub-object of said plurality of sub-objects is cropped. Cropping comprises cutting of certain portions of said sub-object, for instance, the upper left portion or a center portion or a particularly important portion of an sub-object may be presented, wherein said important portion may be automatically determined. Said cropping may be combined with scaling and/or image processing.

According to a method of the present invention, in said first representation, at least one sub-object of said plurality of sub-objects is indicated by an icon. For instance, a sub-object that contains an image may be indicated by an image icon. The size of said icon may be smaller than the original presentation size of said sub-object. It is also possible that when the user focuses a sub-object that is shown in said first representation (scaled or/and cropped), a small icon may be shown in the corner of that sub-object, to indicate to the user that upon selection the sub-object will be enlarged. If the user removes focus from that sub-object, then the icon is taken away too. The icon can be drawn to be transparent, too, so as not to hide content behind it that much. Said icon may be a 2D or a 3D icon.

According to a method of the present invention, sub-objects of said plurality of sub-objects with a size that is above a size threshold and/or that contain an amount of information that is above an information threshold are made active sub-objects. Said size threshold may for instance refer to the original presentation size of a sub-object, or to said size of said sub-object in said first or second representation, and said information threshold may quantitatively refer to an amount of characters in a text area. Said information threshold may also qualitatively prescribe that if a sub-object, for example, only contains an input field or a similar element without further text, the amount of information that this sub-object represents is below said information threshold. In case of a 3D sub-object, said information threshold may also refer to a resolution of said 3D sub-object, as for instance a number of pixels contained therein.

According to a method of the present invention, at least one of said at least one active sub-objects is automatically focused and/or selected according to a selection criterion. Said active sub-object may for instance be determined by an instance in the device, based on said selection criterion, which may for instance prescribe that the first active sub-object of an object has to be focused and/or selected or that the first active sub-object with an input field or image or text or other characteristic content has to be focused and/or selected or that the first sub-object containing new information has to be focused and/or selected. The sub-object containing new information may, for instance, be determined by comparing information of the current object and a previous object. Also the size of the active sub-object may be used as a selection criterion.

According to a method of the present invention, in said second representation, said at least one active sub-object is scaled to a size that is larger than its size in said first representation. In said first representation, the selected sub-object is scaled, cropped or indicated by an icon, or modified according to any combination of these techniques, wherein the size of said first representation of said selected sub-object may be smaller than the original presentation size of said selected sub-object in order to allow a compact presentation of the object (or parts thereof) on said display. In contrast, in said second representation, said selected sub-object is scaled or enlarged to a size that is larger than said size of said selected sub-object in said first representation, so that an improved portrayal of the contents of said selected sub-object is possible. In said second representation contents of an sub-object may be additionally zoomed in and out. This may be done so that zooming affects size of contents of a sub-object shown in second representation. Alternatively, the zooming may be applied to all sub-objects (in first and second representation). In addition to this, there might be a separate zoom for sub-objects that are shown in said first representation.

According to a method of the present invention, within at least one of said sub-objects presented in said first representation, elements can be directly selected by a user. Said elements may for instance be hyperlinks, buttons, portions of 3D objects or similar elements. In that case, the user may separately select said at least one sub-object containing said elements to be presented in said second representation.

According to a method of the present invention, said plurality of sub-objects is composed of different types of sub-objects, and wherein at least one group of sub-objects of a second type is associated with at least one sub-object of a first type. Said types may for instance be different levels of detail, size or appearance of said sub-objects. For instance, if said object is a 3D object, as for instance a 3D map of a town, said object then is divided into a plurality of sub-objects, wherein one type of said sub-objects may be houses, and a second type of said sub-objects may be the rooms of the houses. Then said rooms form a group of sub-objects of said second type that is associated with a house, which is a sub-object of said first type. Said plurality of sub-objects then may have a leveled or hierarchical structure.

According to a method of the present invention, said at least one active sub-object that is present in said second representation is said at least one sub-object of said first type, and wherein in response to a further user operation on said at least one sub-object of said first type, said at least one group of sub-objects of said second type associated with said at least one sub-object of said first type is presented. For instance, if said object is a 3D object that is divided into a sub-objects of a first type, i.e. houses, and sub-objects of a second type, i.e. rooms of the houses, and if one of said houses is presented in said second representation, said house may be made active and then be selected by a user, and then the group of rooms associated with said house as group of sub-objects of said second type may be presented. It may then further be possible to make at least one of said rooms active and to select one of said active rooms in order to get a more detailed or larger view of said room.

It is further proposed a computer program with instructions operable to cause a processor to perform the above-mentioned method steps. Said computer program may for instance be implemented in a device, or may be operated or contained in a browser that is used by said device. The program may also be on the server where the objects are stored or on a content optimization server.

It is further proposed a computer program product comprising a computer program with instructions operable to cause a processor to perform the above-mentioned method steps. Said computer program product may for instance be any type of storage medium that is suited for cooperation with an electronic device that houses said display, for instance a flash card, a SIM card, a RAM, a ROM, a memory stick, a CD, a DVD, or a diskette. From said computer program product, said computer program may be loaded into an internal memory of a digital processor of said device and then be processed.

It is further proposed a device for presenting at least a part of an object, comprising means for at least partially dividing at least one object into a plurality of sub-objects, means for presenting said plurality of sub-objects in a first representation, means for making at least one sub-object of said plurality of sub-objects an active sub-object; and means for presenting at least one of said at least one active sub-objects in a second representation. Said device may for instance be a hand-held electronic device, as for instance a PDA or a mobile phone, or be a part of such a device.

According to a device of the present invention, said sub-objects are presented on a display of a portable electronic device.

It is further proposed a system for presenting at least a part of an object, comprising means for at least partially dividing at least one object into a plurality of sub-objects, means for presenting said plurality of sub-objects in a first representation, means for making at least one sub-object of said plurality of sub-objects an active sub-object, and means for presenting at least one of said at least one active sub-objects in a second representation.

Said system may comprise several logically or physically separated instances that may jointly or separately implement said means for dividing said at least one object into said plurality of sub-objects, said means for presenting said plurality of sub-objects in a first representation, said means for making at least one sub-object of said plurality of sub-objects an active sub-object, and said means for presenting at least one of said at least one active sub-objects in a second representation. For instance, said system may comprise a content optimization server that divides objects received from a server into a plurality of sub-objects, and a client, on which said sub-objects in first and second representation then are presented.

These and other aspects of the invention will be apparent from and elucidated with reference to the embodiments described hereinafter.

BRIEF DESCRIPTION OF THE DRAWINGS

In the figures show:

FIG. 3: a division of the HTML page of FIG. 1 according to the present invention;

FIG. 5a: a further example of an HTML page being displayed in small representation according to the present invention;

DETAILED DESCRIPTION OF THE INVENTION

The present invention proposes a method, a device, a system, a computer program and a computer program product for presenting at least a part of an object, wherein at least one object is at least partially divided into a plurality of sub-objects, wherein said plurality of sub-objects is presented in a first representation, wherein at least one sub-object of said plurality of sub-objects is made an active sub-object, and wherein in response to a user operation on said at least one active sub-object, at least one of said at least one active sub-objects is presented in a second representation. Therein, said objects may either be 2D objects or 3D objects, which are then divided into 2D sub-objects and 3D sub-objects, respectively.

Figure 7A:
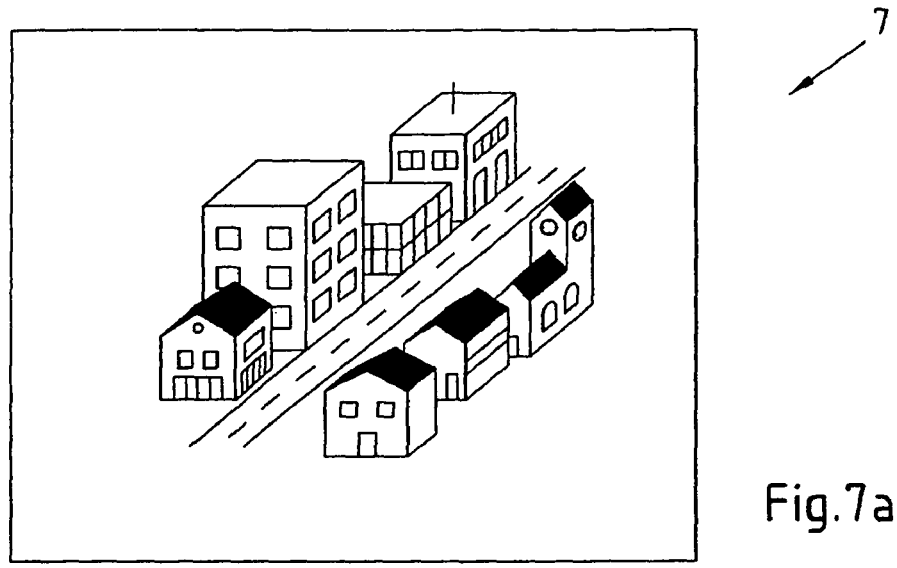
FIG. 7a: an exemplary 3D map of a town.
Figure 7B:
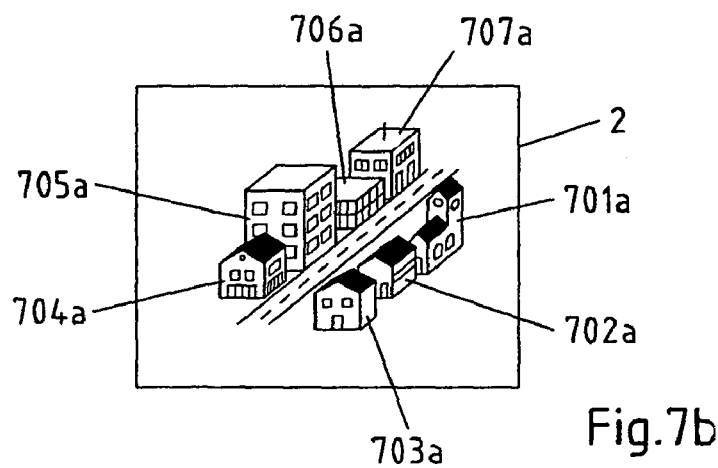
FIG. 7b: an example of the 3D map of FIG. 7a being divided into 3D sub-objects and presented on a display in small representation according to the present invention.
Figure 8:
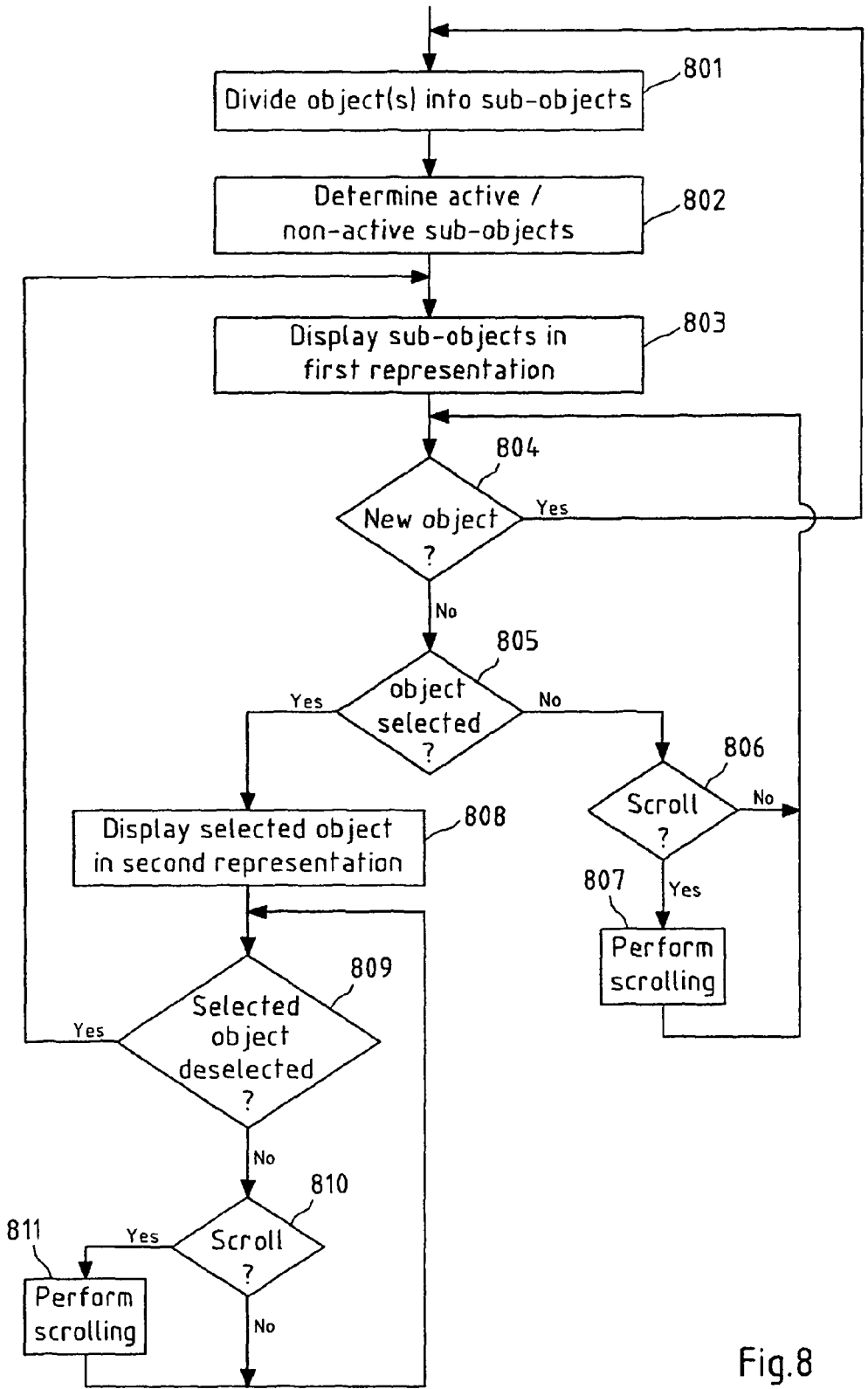
FIG. 8: an exemplary flowchart of a method according to the present invention.
Figure 9:
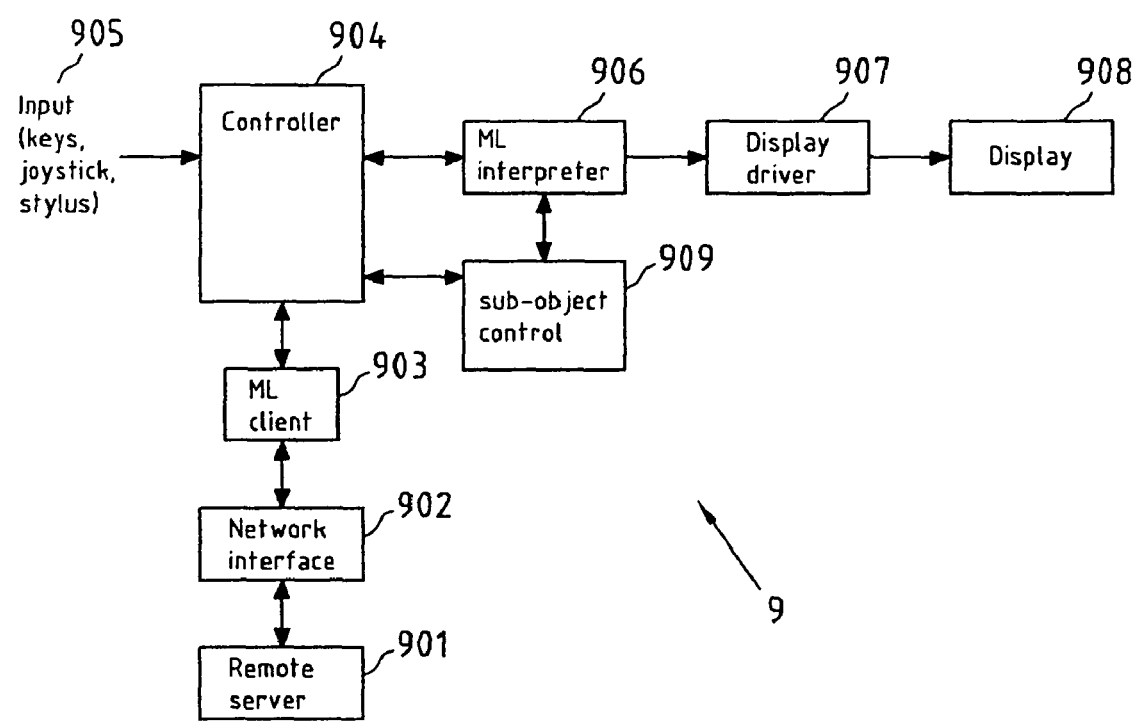
FIG. 9: an exemplary set-up of a device according to the present invention.

In FIGS. 1 to 6, preferred embodiments of the present invention will be explained that are suited for the presentation of 2D objects. Therein, the 2D objects are denoted as pages, and the sub-objects are denoted as areas. With reference to FIGS. 7a and 7b, a preferred embodiment of the present invention that is suited for the presentation of 3D objects will be explained. Finally, FIGS. 8 and 9 present a flowchart of a method and a device according to the present invention, which are suited for the presentation of both 2D and 3D objects.

Figures 1, 2A, 2B:
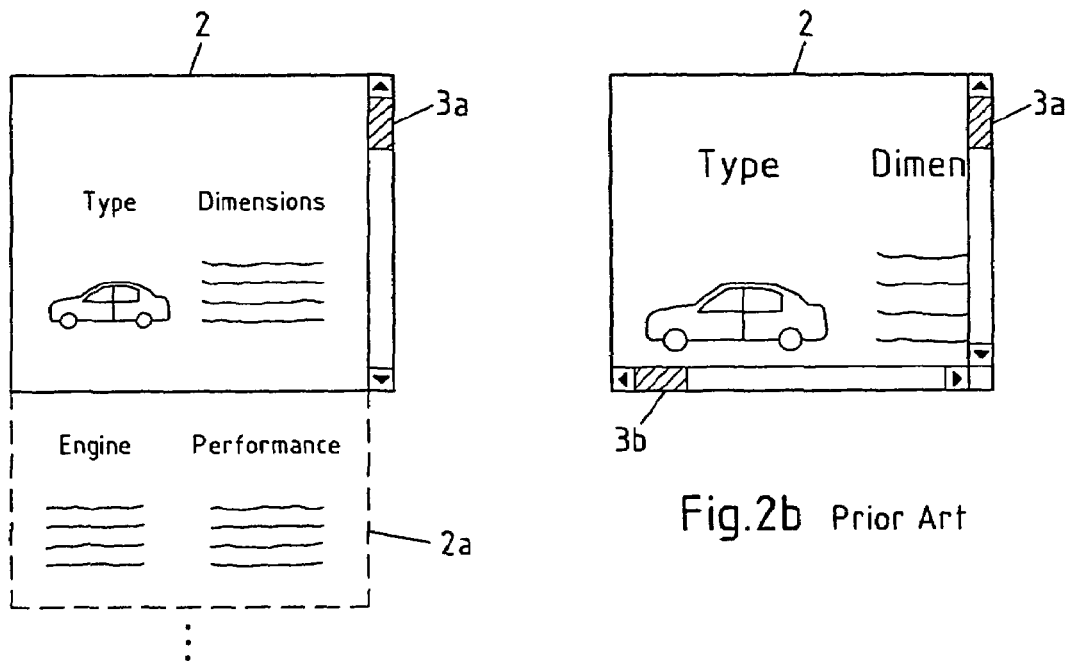
FIG. 1: an exemplary Hypertext Markup Language HTML page according to the prior art.
FIG. 2a: the HTML page of FIG. 1 being rendered to fit the width of a display according to the prior art.
FIG. 2b: the HTML page of FIG. 1 being displayed in original layout mode according to the prior art.

FIG. 1 depicts an exemplary Hypertext Markup Language HTML page 1 that basically comprises a table with four rows and four columns. Said HTML page 1 is given in original presentation size, which is defined by the HTML format. For instance, said HTML format may prescribe the font sizes, and the image sizes in pixels. The content of this HTML page 1 is related to information on cars, and each of the last three rows of the table contains a picture, dimension parameters, engine parameters and performance parameters of one specific type of car. Note that the textual information in the table cells is only depicted symbolically.

FIG. 2a depicts the HTML page of FIG. 1 being rendered to fit the width of a display 2 according to the prior art. With the HTML page 1 being too large to fit on the display 2 of a portable device, for instance, a mobile phone, the page has to be rendered, and it is the result of the rendering that only the left upper quarter of the HTML page, in slightly reduced scale, is visible on the display 2. To avoid at least horizontal scrolling, the right upper quarter of the HTML page 1 is now positioned below the left upper quarter that is visible in the display 2, and can be inspected by means of vertical scrolling with a vertical scroll bar 3a. This is schematically depicted in FIG. 2a by the dashed box 2a being positioned below the display 2. Further vertical scrolling then would move the left lower quarter of the HTML page 1 into the display 2, and finally the right lower quarter of the HTML page 1 would be moved into the display 2.

The prior art rendering technique obviously destroys the layout of the table contained in the HTML page 1. Whereas a viewer can easily assign the dimension parameters displayed in the display window 2 of FIG. 2a to the car in the first row of the table, because the required row and column labels of the table are still available in the portion of the HTML page 1 that is visible within the display 2, such a clear assignment is no longer possible for the engine and performance parameters in the right upper quarter of the HTML page 1, when the HTML page 1 is rendered and displayed on the display 2 as indicated by the dashed box 2a in FIG. 2a. This is due to the fact that the row labels, in this case the picture of the car whose parameters are listed in the respective row, are no longer depicted within the dashed box 2a of FIG. 2a. It is easily seen that, also when displaying the left and right lower quarter of the HTML page 1 on the display 2, no clear assignment of the textual information to the row and/or column labels of the table is possible. The prior art rendering technique thus breaks up the structure of the table and aggravates the comprehension of the content of the HTML page 1.

To allow a viewer to inspect the HTML page 1 as a whole, without destroying its structure as it is the case in the rendering technique of FIG. 2a, prior art devices with small displays usually offer an original layout mode. This original layout mode, which is depicted in FIG. 2b, abandons rendering and scaling of the page and thus requires both vertical 3a and horizontal 3b scrollbars, so that all portions of the HTML page 1 can be moved into the display 2, complicating and slowing down the comprehension of the HTML page 1.

FIG. 3 depicts a division of the HTML page 1 of FIG. 1 according to the present invention. The 16 table cells of the table contained in the HTML page 1 are assigned a respective area 101 . . . 116. This may for instance be performed by a browser or by a device in the device that operates the display, on which the HTML page 1 is to be depicted. The process of dividing the HTML page 1 into areas 101 . . . 116 may be based on the structure of the HTML page 1, which may be represented by HTML elements such as tables, paragraphs, frames, images or other, and which may be detected by processing the source code of the HTML page 1. For instance, the structure of the HTML page 1 may be examined by searching the HTML page 1 for specific HTML tags that define the beginning and the end of such HTML elements.

Figure 4A:
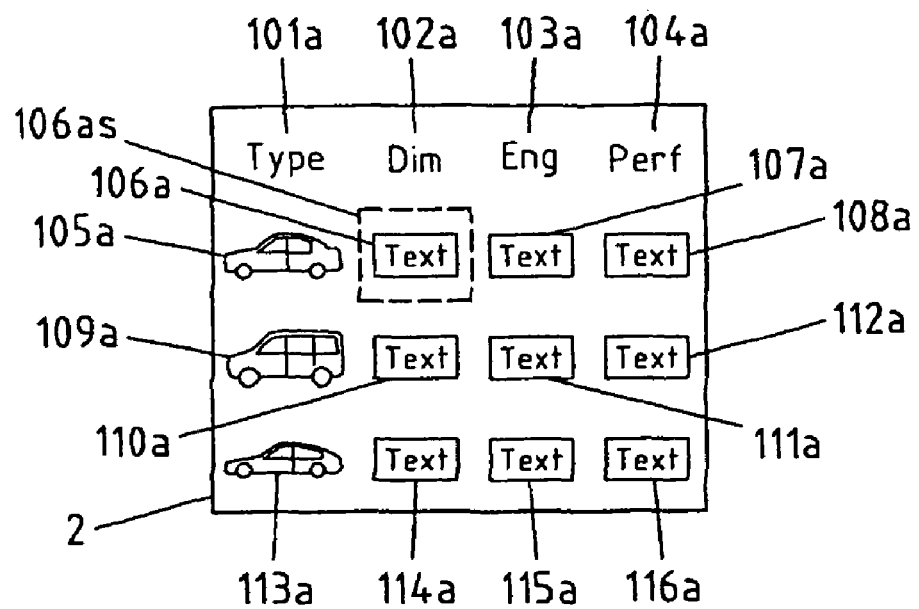
FIG. 4a: the HTML page of FIG. 3 being displayed in small representation according to the present invention.

FIG. 4a illustrates the HTML page of FIG. 3 being displayed (presented) in a first representation according to the present invention, wherein this first representation is chosen to be a small representation throughout this exemplary embodiment of the present invention. The areas 101 . . . 116 as obtained by the division of the HTML page 1 are transformed into areas 101a . . . 116a in small representation. For the areas 101a, 105a, 109a and 113a, this transformation is achieved by scaling the size of the areas 101, 105, 109 and 113 of the original presentation size HTML page 1 to a smaller size. For the areas 102a, 103a and 104a, this transformation is achieved by combined scaling and cropping of the areas 102, 103 and 104. Finally, the areas 106a . . . 108a, 110a . . . 112a and 114a . . . 116a are all assigned a text icon, which indicates that the corresponding areas 106 . . . 108, 110 . . . 112 and 114 . . . 116 contain text that would be unreadable when being scaled to small representation format.

In FIG. 4a, all areas in small representation 101a . . . 116a are active areas. Thus a browser or a device within the device that operates the display on which the HTML page 1 is to be displayed may have examined at least a part of the areas 101 . . . 116 and, according to a selection criterion, for instance being related to the type and/or amount of information contained in the area, has decided if areas shall be active or not. FIG. 4a further depicts a dashed accentuation frame, which indicates that a viewer currently performs a user operation on said active area 106a, which is chosen as a selection throughout this exemplary embodiment of the present invention. In what follows, a selected area will always be identified by an "s" that is appended to its numeral, so that the selection of area 106a leads to a selected area 106as. The accentuation frame, which may be moved from one active area to the other by a viewer via a user interface, for instance a joystick, is only one of several possible ways of selecting active areas. Active areas may equally well be selected via a stylus or a finger on a touch screen display, via tracking of eye movements, via the assignment of numbers or symbols to active areas and the selection of these numbers or symbols via keyboard input or voice command, or via shortcuts assigned to a certain selection operation, for instance for the selection of the area that is located left, right, above or below the currently selected or focused area or for the selection of the previously selected area.

Figure 4B:
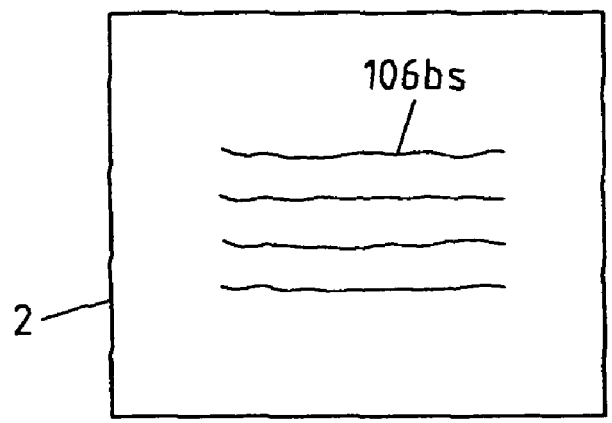
FIG. 4b: a selected area of the HTML page of FIG. 3 being displayed in large representation according to a first embodiment of the present invention.
Figure 4C:
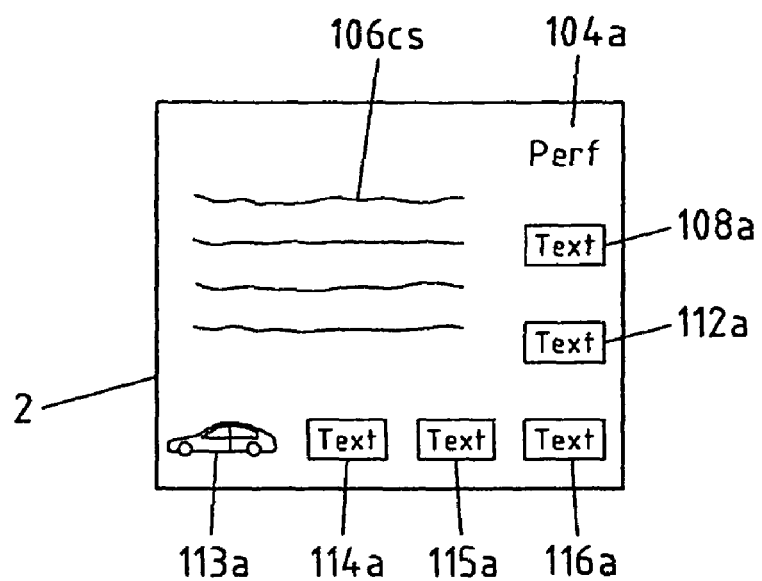
FIG. 4c: a selected area of the HTML page of FIG. 3 being displayed in large representation according to a second embodiment of the present invention.
Figure 4D:
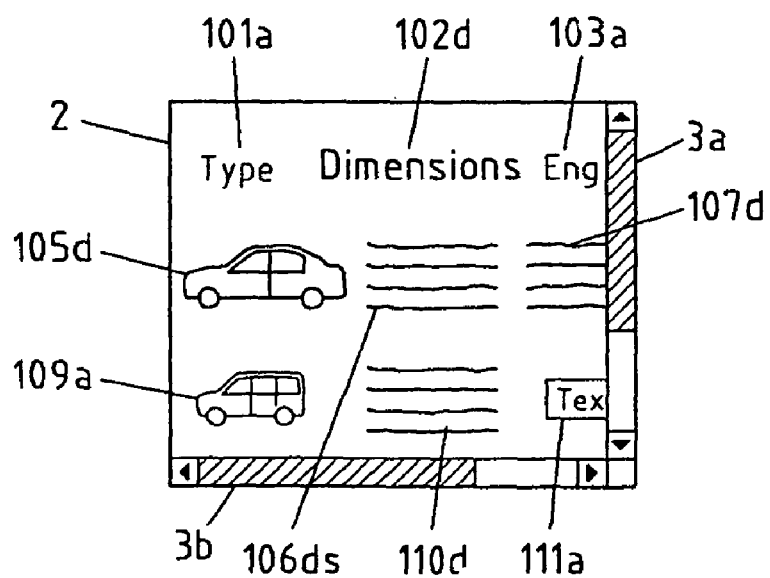
FIG. 4d: a selected area of the HTML page of FIG. 3 being displayed in large representation according to a third embodiment of the present invention.

FIGS. 4b, 4c and 4d present three specific embodiments of the present invention, wherein each embodiment proposes a different way of displaying (presenting) the selected area 106bs, 106cs or 106ds on the display 2 in a second representation, wherein this second representation is chosen as a large representation throughout this exemplary embodiment of the present invention.

According to a first embodiment, FIG. 4b depicts the displaying of the selected area 106bs in large representation, wherein large representation in this embodiment means that the selected area 106bs is scaled to fit the width of the display 2, and wherein in this embodiment, only the selected area 106bs is displayed on the display 2. Note that, whereas in the small representation 106a of area 106, a text icon was used, now a scaled version of the area 106 as in the original HTML page 1 of FIG. 3 is displayed. From the area 106bs in large representation, the viewer now can extract all the information that may not have been clearly visible from area 106a in small representation. According to this first embodiment of the present invention, the viewer thus may first get an overview on the structure of the page according to FIG. 4a, wherein all areas of the page are given in small representation, and then, after selecting an area of interest 106as, this area is displayed in enlarged fashion as area 106bs, i.e. as large as possible but not requiring the use of horizontal and/or vertical scroll bars. To return to the small scale representation as in FIG. 4a, the viewer may de-select the selected area 106bs, for instance by pressing a de-selection key.

According to a second embodiment, FIG. 4c depicts the displaying of the selected area 106cs in large representation, wherein large representation in this embodiment means that the selected area 106cs is significantly larger than the area 106a in small representation. The selected area 106cs in large representation is displayed together with other areas 104a, 108a, 112a and 113a . . . 116a in small representation on the display 2. Basically, the selected area 106cs is three times the size of its corresponding area 106 as in small representation and thus covers the areas 101a . . . 103a, 105a . . . 107a and 109a . . . 111a. The content of area 106 then may not be presented as large as in the first embodiment, however, the remaining of the areas in small representation on the display when displaying the selected area 106cs in large representation always shows the viewer quite plainly the structure of the page, so when selecting areas and enlarging (large representation) or reducing them (small representation), the viewer's orientation may be supported.

According to a third embodiment, FIG. 4d depicts the displaying of the selected area 106ds in large representation, wherein large representation in this embodiment means that the selected area 106ds is significantly larger than the area 106a in small representation. The selected area 106ds in large representation is displayed together with other areas 102d, 105d, 107d, 110d in large representation and areas 101a, 103a, 109a and 111a in small representation on the display 2. The effect of supporting the orientation of the viewer when switching between large and small representation is similar to the second embodiment. However, to avoid gaps between the selected area 106ds and areas 102d, 105d, 107d, 110d, which are at least partially at the same height or width as the selected area, and to preserve the rectangular layout of the table, all these areas are displayed in large representation too, wherein the scaling of these areas 102d, 105d, 107d, 110d is related to the scaling of the selected area 106ds. In this case, due to the table layout, all areas 102, 105, 106, 107 and 110 are scaled by the same factor. The displaying of the areas 101a, 103a, 109a and 111a in small representation may avoid an overloading of the display 2 with information, furthermore, the enlargement effect is accentuated by maintaining the contrast between large and small representation on the same display.

Figure 5B:
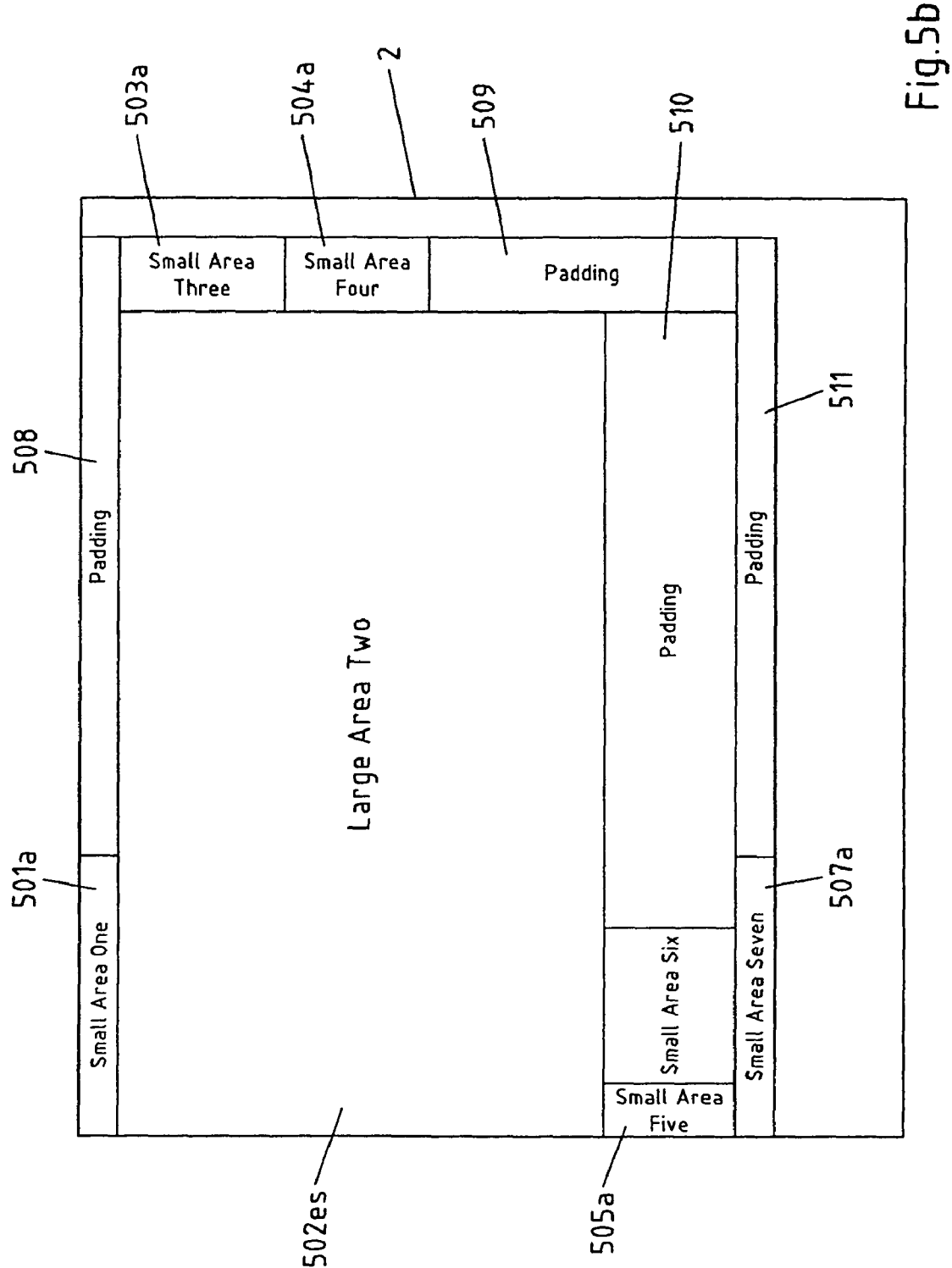
FIG. 5b: a selected area of the HTML page of FIG. 5a being displayed in large representation according to a fourth embodiment of the present invention.
Figure 5C:
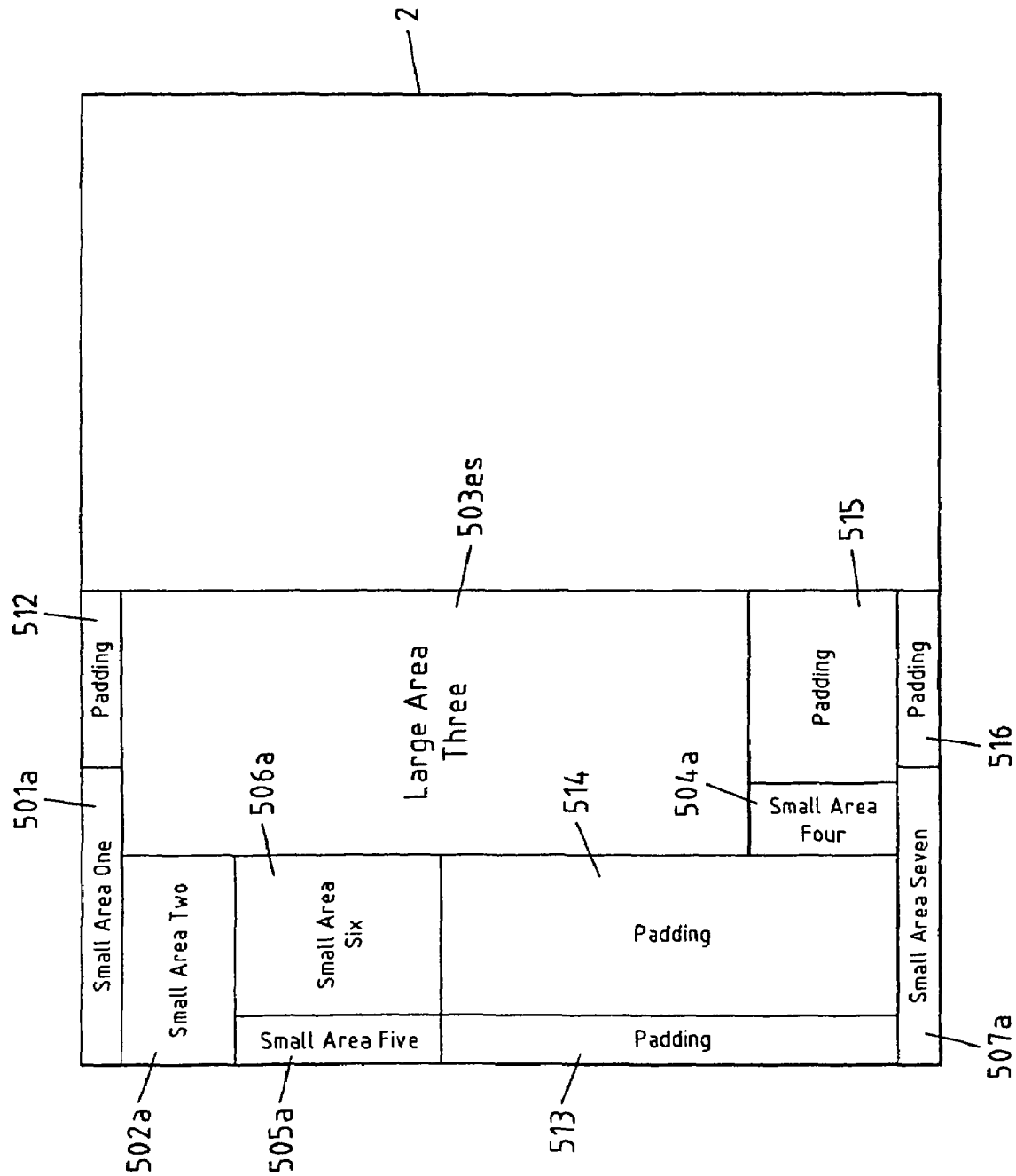
FIG. 5c: a further selected area of the HTML page of FIG. 5a being displayed in large representation according to the fourth embodiment of the present invention.

FIGS. 5a-5c visualize the presentation of selected areas of a HTML page in large representation according to a fourth embodiment of the present invention.

In FIG. 5a, an HTML page that already has been divided into a plurality of areas is displayed on a display 2 in small representation. Said areas in small representation are denoted as 501a . . . 507a. Said areas in small representation may for instance be obtained from said original presentation size HTML page via a process of dividing said HTML page and scaling the divided parts. As can be seen from FIG. 5a, the HTML page in small representation has a structure that is more complex than the simple table structure of the HTML page of FIG. 1.

FIG. 5b depicts the displaying of the HTML page of FIG. 5a when area 502a (in small representation) has been selected by a user and then is displayed in large representation as area 502es. Said selected area in large representation 502es is displayed on the same display 2 with the areas 501a, 503a . . . 507a in small representation. However, padding areas 508 . . . 511 have been created so that the basic arrangement of the areas of the HTML page with respect to each other is still visible. Said padding areas 508 . . . 511 may, for instance, have the same background colour as an adjacent area in small representation, or may have a fixed colour, or may be transparent to that the standard background of the display is visible. The introduction of said padding areas may be interpreted as a scaling in at least one dimension of neighbouring areas of said area 502es that is displayed in large representation. In FIG. 5b, when area 502es is displayed in large representation, the other areas in small representation are left and top aligned, to show them as close to each other as possible. In the selected area 502es, which is displayed in large representation, links and other HTML elements are selectable. This may also account for said areas in small representation.

In the example of FIG. 5b, the canvas of areas of said HTML page in small and large representation is aligned to the left upper corner of the display 2. Of course, different alignments to other edges of the display 2 or a centering may equally well be possible. Furthermore, the areas 501a, 503a . . . 507a in small representation have the same size as the corresponding areas in small representation of FIG. 5a. Alternatively, said small representation scale might be slightly modified when at least one of said areas in displayed in large representation as depicted in FIG. 5b, for instance in order to better match the dimensions of the display.

FIG. 5c depicts a canvas of areas in small and large representation when area 503a of FIG. 5a (in small representation) has been selected by a user and then is displayed in large representation as area 503es together with areas 501a, 502a, 504a . . . 507a. Here, again padding areas 512-516 were introduced to preserve the basic layout of the HTML page. Note that, instead of selecting area 503a in a display state as depicted in FIG. 5a (i.e., where all areas are displayed in small representation), it is also possible that area 503a is selected in a display state as depicted in FIG. 5b (i.e., where at least one area is in large representation and the remaining areas are in small representation), in order to arrive at a display state as depicted in FIG. 5c. This may for instance be achieved with an accentuation or focus that can be moved between the areas (regardless whether the areas are in small or large representation or if a mix of large and small representations is presently displayed), and wherein a selection then is manifested by pressing a button or key when the desired area is currently accentuated or focused. The user may also be provided with shortcuts for enlarging certain areas, for instance the left or right area or the previous or next area.

Figure 6:
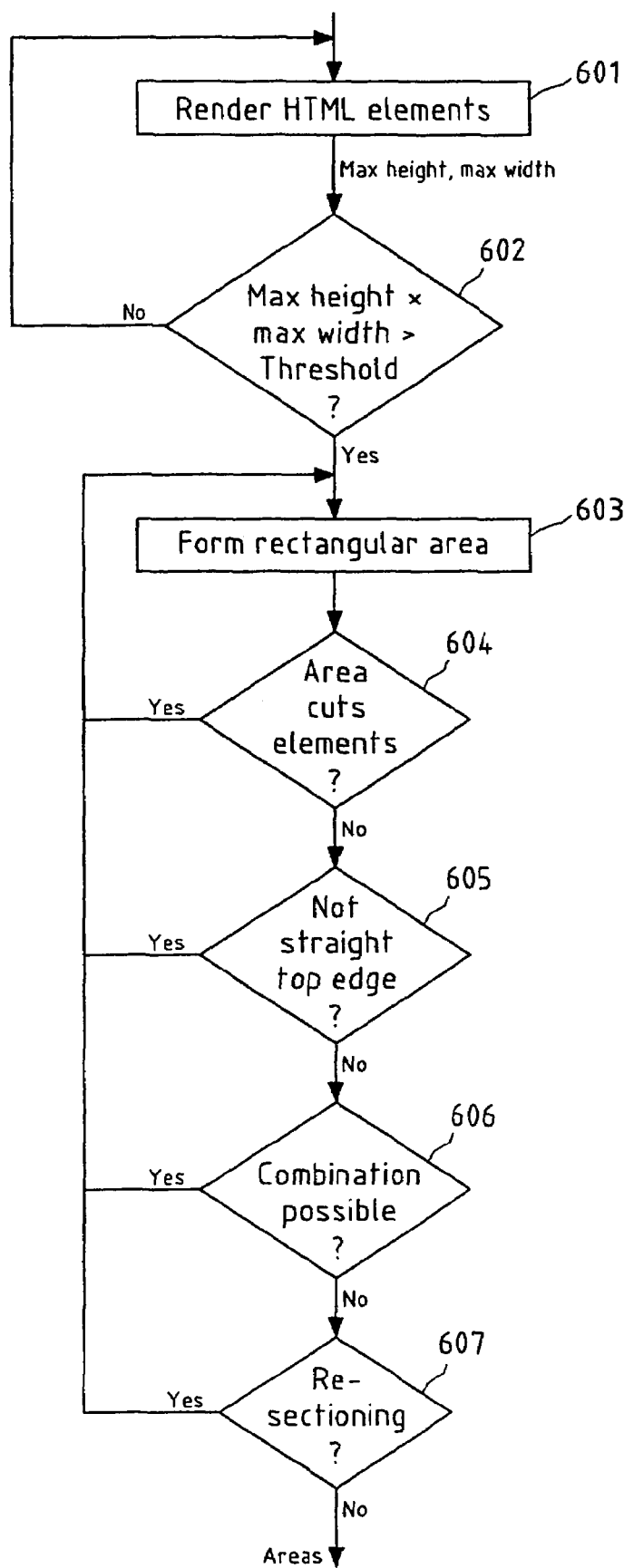
FIG. 6: an exemplary flowchart of an algorithm for dividing a page into a plurality of areas according to the present invention.

FIG. 6 depicts a simplified exemplary flowchart of an algorithm for dividing one or several HTML pages (2D objects) into a plurality of areas (2D sub-objects) according to the present invention. This algorithm may for instance be executed in step 801 of the flowchart of FIG. 8 (see description below).

In step 601 of the flowchart of FIG. 6, HTML elements of one or several HTML pages are rendered and investigated in the order they appear in the HTML source code of said page or pages. In said step 601, calculation of pixel values corresponding to said HTML objects is, for instance, performed as if an HTML page was shown in its original layout with 100% zoom factor. As a result, a maximum height and a maximum width in pixels of a number of rendered HTML objects is obtained.

In a step 602, it is then checked if the product of said maximum height and said maximum width is larger than a pre-defined threshold, for instance 100,000 pixels. If this is the case, a rectangular area containing the HTML objects rendered in step 601 is formed in a step 603. Otherwise, the step 601 of rendering HTML elements is continued until the condition of step 602 is met.

It should be noted that the calculation of step 602 only has to be performed when an area grows vertically and/or horizontally; it does not have to be performed after every selection of an area or similar changes.

In step 603 (and also in step 602), when forming an area (i.e. calculating the display area in pixels that the created area would take), table areas having no information content (no text, no images, no input fields or similar) may not be taken into account (i.e. may not be included into formed area). In other words, within tables, areas are formed according to information content in the order in which said information content appears in the HTML page source code (e.g. HTML, XHTML or similar source code).

In a step 604, it is then checked if a lower edge of said formed area would vertically cut an element that cannot be divided (for instance an <image>, or an <object>): If this is the case, forming a section according to step 603 is retried so that the last HTML element tried to be included at the last time in step 603 is not included anymore. This procedure is repeated until it leads to a lower edge of said area that does not cut any element. In addition to elements that cannot be cut, this procedure may also be applied to paragraphs (<p>, <div>) and forms (<form>) and small tables (<table>).

This step may be performance-optimized by iterating first in bigger steps, and then element by element when new area edges are almost found.

According to step 603, it may be advantageous to leave a small padding between area borders and content, so that area borders and content do not touch even if an area is focused.

In a step 605, it is checked whether said formed area would not have a straight top edge. If this is the case, the algorithm returns to step 603 and tries to form a new area with a straight top edge. For example, if the first element for an area is in the middle of a left table column, and the next element would be in the top of the right table column, the end of an area should be created before the element that would make the top edge not straight.

If this is not the case, opportunities for combining sections are checked in a step 606.

For instance, if the width of an area matches that of a previous area, if these two areas are horizontally similarly positioned, and if the number of pixels of a combined area obtained when these two areas are taken together is less than a threshold, for instance 150,000 pixels, then these two areas are combined.

Furthermore, if forming areas would create empty space below areas, this empty space is combined with one or more area above it, by vertically extending an area above it by a required amount. In this special case, the empty space is not taken into account when checking a condition for re-sectioning in a step 607, as will be explained below.

If this procedure of vertically extending areas to avoid empty spaces still leaves empty space between areas, vertical borders of areas are horizontally moved, so that empty space disappears (i.e. becomes included into areas). In this special case, too, empty space is not taken into account when checking a condition for re-sectioning in a step 607.

Finally, in a step 607, it is checked if re-sectioning of said formed area is necessary, wherein in said re-sectioning, the step 603 is again performed to form a new rectangular area.

For instance, if the number of pixels of a formed area gets bigger than a threshold, for instance 300,000 pixels, after its creation (for example because of a script adding content or arrival of big images), re-sectioning is done for that area and areas after it.

Similarly, if all content of a formed area disappears after its creation (because of a script or external CSS), re-sectioning is done for that area and areas after it.

As a result of the algorithm of FIG. 6, a plurality of areas is output. These areas can be made active and be then displayed on a display in small representation, and, upon selection, can be displayed in large representation. Areas may be shown on the display only after the next area has been created. This is because sequential areas may be combined in step 606.

The exemplary flowchart for an algorithm for dividing one or several HTML pages into areas may be further refined by the following features:

If an absolute size of an image is set in an HTML source code, placeholders of that size may be rendered instead of said image in said step 601. If a size is not set (nor has been received yet with an image file), in said step 601 said image may be assumed to be of fixed size, for instance 50 pixels high and 100 pixels wide.

If a script writes a sequence of elements to an HTML page, that whole sequence added by a script is kept inside the same area.

If a script moves focus to another area than the currently active one, the area to which the focus moved is zoomed, and the previously zoomed area is shrunk.

If the number of pixels of an HTML element that cannot be divided into smaller pieces (for instance an <img> or <object>) is larger than a threshold, for instance 300,000 pixels, an own area may always be created for that element. The height of that area would be the height of the element, the left edge would be next to an area on the left (or edge of canvas if there is not an area on the left), and the right edge would be next to an area on the right (or edge of canvas if there is not an area on the right). In addition to HTML elements that cannot be divided, this rule may also be applied to big paragraphs (<p>, <div>) and big forms (<form>). [0110] If an HTML element is hidden (using CSS), but if it is still set to reserve corresponding space for itself (using CSS), in said step 603 of forming rectangular areas it is handled as if it was visible (i.e. it is taken into account when calculating said area).

It is readily understood that the steps of the above-presented algorithm for dividing a HTML page into a plurality of areas can basically also be applied for dividing 3D objects into a plurality of 3D sub-objects or 3D blocks, if in step 601, 3D objects, such as XRML elements are rendered, if in step 602, the product of the maximum width, height and depth is checked against a threshold, and if in step 603, a parallelepiped is formed. The steps of checking if said parallelepiped cuts 3D elements, has non-straight edges, can be combined or requires resectioning then can be performed analogously. In this algorithm, it may be advantageous to allow that the 3D sub-objects can slightly overlap with each other to provide nicer transitions. If the 3D object does not possess a hierarchical structure that allows for the above-described division algorithm, the 3D object may simply be divided into a plurality of parallelepipeds of fixed size, for instance into a plurality of cubes.

FIG. 7*a* depicts an exemplary 3D map of a town 7 in original presentation size, which is to be displayed on the display 2 of a hand-held device. As the original presentation size of the 3D map 7 is much too large to fit on said display 2, and as scaling the entire 3D map 7 to fit the display dimensions would remove most of the details contained in said 3D map 7, said 3D map 7 is divided into a plurality of 3D sub-objects according to the method of the present invention.

FIG. 7*b* depicts the outcome of this proceeding: the 3D map 7 of FIG. 7*a* has been divided into 3D sub-objects (701*a* . . . 707*a*) and is displayed in small representation on the display 2. Due to the scaling of the 3D sub-objects, which in the present example are the buildings of the 3D map, from original presentation size to the small representation, most of the details of the buildings are lost. However, as said 3D sub-objects 701*a* . . . 707*a* are made active 3D sub-objects, they can be selected by a user and then be displayed on said display 2 in large representation.

Figure 7C:
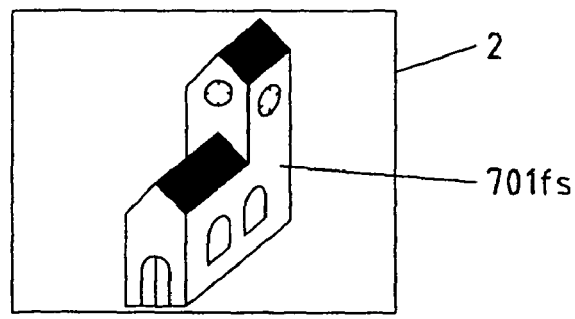
FIG. 7c: a selected 3D sub-object of the divided 3D map of FIG. 7b being presented on a display in large representation according to the present invention.

FIG. 7*c* depicts this large representation of 3D sub-object 701*a*, which is now denoted as 701*fs*. The size of said selected 3D sub-object 701*fs* is significantly larger than the size of the 3D sub-object 701*a* in small representation, so that now all details of the 3D sub-object can be inspected by a user. It is readily understood that a variety of different large scale representation modes exist also for the case that 3D objects are presented on the display 2, for instance neighbouring 3D sub-objects may also be at least partially displayed together with the selected 3D sub-object 701*fs* either in small or large representation. Thus it is possible to display a selected 3D sub-object in second (large) representation and at the same time to display surrounding 3D sub-objects in first (small) representation, so that the selected 3D sub-object appears larger and then may for instance overlay the other 3D sub-objects that are in said first representation or move the other 3D sub-objects that are in first representation outwards to create space for the selected 3D sub-object in said second representation. Scrolling from one 3D sub-object to neighbouring 3D sub-objects may also be possible. Furthermore, it may be possible to perform all kinds of operations on the 3D sub-objects that are possible with the original presentation size 3D object, for instance, if the 3D map of the town 7 can be rotated or zoomed, this may also be possible for the selected 3D sub-object 701*fs* in large representation.

Furthermore, it may be possible that said 3D map 7 of said town has been divided into different types of sub-objects. In the present case, said town may have been divided into a first type of sub-objects, for instance houses or buildings, and a second type of sub-objects, for instance rooms of the buildings. After making said sub-object 701*fs* in FIG. 7*c* a selectable sub-object, and, in response to a user interaction (e.g. selection of said sub-object 701*fs*), the rooms associated with said sub-object 701*fs* may be displayed, for instance by making the walls of said object 701*fs* transparent. Furthermore, then said rooms may be made active and then may be exclusively displayed on said display in enlarged or more detailed fashion when being selected.

It should be noted that the dividing of the 3D map 7 into buildings is only one possibility of division; said 3D map 7 may equally well be segmented into parallelepipeds of equal or different sizes.

FIG. 8 depicts an exemplary flowchart of a method according to the present invention. When a new object is chosen by a viewer to be displayed on a display, in a first step 801, the object is suitably divided into sub-objects. The set of sub-objects then is examined in a step 802 in order to determine which sub-objects shall be active sub-objects and which sub-objects shall be non-active sub-objects. The set of active and non-active sub-objects then is displayed on the display in a first representation in a step 803, which may for instance be a small representation. This step may also comprise the transformation of the sub-objects form original presentation size format to a first representation format, for instance via scaling, cropping or using an icon. When the object is displayed in said first representation, a viewer may choose that he wants to view a different object, which is checked for in step 804. If this is the case, steps 801 to 803 are repeated for the new object. Otherwise, it is checked if the viewer has selected one of the sub-objects in said first representation in a step 805. If this is the case, the selected sub-object is displayed in a second representation in a step 808, which may for instance be a large representation. This step may also comprise the scaling of the selected sub-object to the second representation format. It is then checked in a step 809 if the selected sub-object is de-selected by a viewer. In this case, the method jumps back to step 803 to allow the selection of another or the same sub-object. If the selected sub-object is not de-selected, it is checked in a step 810 if scrolling is desired by the viewer.

If this is the case, scrolling is performed in a step 811, for instance to explore sub-objects in the neighborhood of the selected sub-object. This scrolling may be performed seamlessly, or from sub-object to sub-object. If the scrolling operation in step 810 is finished or if no scrolling is desired by the viewer, the method jumps back to step 809 to allow for a de-selection of the selected sub-object. If in step 805 no sub-object is selected, it is checked in a step 806 if scrolling is desired by a viewer, and if this is the case, scrolling is performed in a step 807. After the scrolling operation, or if no scrolling is desired, the method jumps back to step 804 to allow the choice of a new object by the user.

FIG. 9 finally depicts an exemplary set-up of a device 9 according to the present invention. The device 9, for instance a hand-held device such as a mobile phone, comprises the standard components required to implement a browser functionality: The controller 904 controls the function of the browser and receives input 905 from a viewer for example via the keyboard, touch-screen, mouse interaction, or voice commands, e.g. a new Markup Language (ML) object (for instance a HTML page or a VRML object) that is to be loaded. The ML client 903 provides services to the controller 904, in particular fetching of new ML objects via the network interface 902, which is connected to a remote server 901. If the device 9 is a hand-held device, said connection will usually be a wireless connection. The ML interpreter 906 is responsible for the display of ML objects on the display 908, which is controlled by the ML interpreter 906 via a display driver 907. The ML interpreter 906 parses the ML source code of the ML object and provides the display driver 907 with the corresponding results. In the prior art, in particular rendering of ML objects to fit the display 908 is performed by the ML interpreter 906 and display driver 907. As an additional component, according to the present invention, a sub-object control instance 909 is contained in the device 9, which supports the ML interpreter 906 and the controller 904 and in particular adds functionality to at least partially divide a least one ML object into a plurality of sub-objects, to cause the display of the plurality of sub-objects in a first representation, to make at least one sub-object of said plurality of sub-objects a active sub-object, and to cause the display of at least one active sub-object in a second representation. Said sub-object control device may further comprise functionality to determine whether a sub-object should be an active sub-object or a non-active sub-object. Together with the controller 904, said sub-object control instance 909 may further check if an active sub-object has been selected by the viewer for presentation in said second representation and if a selected sub-object is de-selected by a viewer, in both cases via the input interface 905. Also scrolling, initiated by a viewer via the input interface 905, may be controlled by the sub-object control instance 909 together with the controller 904.

Further advantageous embodiments of the present invention will now be described without explicit reference to figures.

According to the present invention, at least two objects may at least partially be divided into said plurality of sub-objects. Said at least two objects may, for instance, be inter-linked web pages, or pages of a text document, or pages of a presentation, or 3D objects of a 3D structure, or similar information-carrying objects. By at least partially dividing these at least two objects into sub-objects, it becomes possible to present said at least two objects (i.e. the corresponding sub-objects) simultaneously in said first representation, so that the structure of said objects is more quickly and comfortably presented to a user. Multiple objects may thus be presented at the same time, wherein said sub-objects said at least two objects are at least partially divided into may include parts of several objects, and/or an object might be a sub-object, and/or every object may comprise multiple sub-objects.

According to the present invention, in said second representation, said selected sub-object may be scaled to fit at least one dimension of a display. Said selected sub-object may for instance be scaled to the width or the height of the display, or both. When scaled to fit at least one dimension of the display, content of an sub-object may still be bigger than the display. In this case, content can be scrolled inside the sub-object.

According to the present invention, in said second representation, said selected sub-object may be scaled to its original presentation size. Presenting said selected sub-object being scaled to its original presentation size may require 1D, 2D or 3D scrolling (in one, two or three dimensions of a Cartesian or spherical coordinate system, respectively, because said original presentation size may exceed the dimensions of a display.

According to the present invention, textual content of said selected sub-object scaled to its original presentation size may be forced to wrap to a display width.

According to the present invention, content of said selected sub-object scaled to its original presentation size may be forced to align to the left, to the right, or to the center. For instance, aligning to the right may be preferred if said content is normally read from right to left.

According to the present invention, only said selected sub-object may be presented in said second representation. Sub-objects in the neighborhood of said selected sub-object may then be not presented, irrespective if they are in said second or in said first representation.

According to the present invention, selecting one sub-object shown in first representation may cause all the sub-objects to be enlarged, for example, to show a whole object in its original layout in full size. In this case information of a selected sub-object could be used for centering a display so that as much as possible of content belonging to the selected sub-object is shown.

According to the present invention, said selected sub-object and at least one neighboring sub-object of said selected sub-object may be presented in said second representation. Said neighboring sub-objects then do not necessarily have to be directly adjacent to said selected sub-object, also sub-objects with a larger distance to said selected sub-object may be understood as neighboring sub-objects. Presenting neighboring sub-objects in second representation may be advantageous if the selected sub-object in second representation does not entirely cover a display, so that gaps at the edges of said selected sub-object can be avoided by filling them at least partially with presented content from neighboring sub-objects.

According to the present invention, at least said selected sub-object in said second representation and at least one of said plurality of sub-objects in said first representation may be presented on a display at the same time. Starting from said plurality of sub-objects being presented in said first representation, it is then possible to select one of the active sub-objects among them in order to enlarge said selected sub-object (second representation), wherein the other sub-objects of said plurality of sub-objects remain in said first representation. Only said selected sub-object then may be in said second representation, or, said selected sub-object and neighboring sub-objects may be in said second representation. A user may be enabled to move focus over the edges of sub-objects shown in said second representation to focus an sub-object shown in said first representation. Then if the user selects that sub-object shown in said first representation, that sub-object is enlarged to said second representation and at the same time, one or more of the sub-objects that were previously shown in said second representation can be returned to be shown in said first representation.

According to the present invention, sub-objects that are at least partially at the same height or width or depth as said selected sub-object may be scaled at least in one dimension in accordance with the scaling of said selected sub-object. If sub-objects in said second and said first representation are presented at the same time, in order to preserve the layout of the object and in order to avoid coverage of sub-objects in said first representation by selected or neighboring sub-objects in said second representation, it may be advantageous that sub-objects in the same alignment with respect to a 2D or 3D space as the selected sub-object are scaled in accordance to the scaling of said selected sub-object, wherein said scaling may be done only in one dimension, for instance, only the height or width or depth of said neighboring sub-objects may be adapted to the scaled height or width or depth of said selected sub-object.

According to the present invention, the method may further comprise 1D, 2D or 3D scrolling. Scrolling may be understood as shifting the content that is currently visible in a display, i.e. the sub-objects in said first and/or second representation, so that adjacent sub-objects, which can not be presented with said content at one time within the display due to its limited dimensions, become visible. Scrolling may be possible seamlessly, or on a grid basis, for instance an sub-object-to-sub-object basis. Said scrolling may be controlled by a viewer via keys, a joystick, a stylus or a finger in combination with a touch-screen display, a mouse pointer or similar interaction techniques. Therein, 1D scrolling represents scrolling with respect to one dimension of a Cartesian or spherical coordinate system (e.g. the x, y or z-axis in a Cartesian coordinate system, or the azimuth angle, elevation angle or radius in a spherical coordinate system), 2D scrolling represents scrolling with respect to two dimensions, and 3D scrolling represents scrolling with respect to three dimensions.

According to the present invention, the method may further comprise presenting said plurality of sub-objects in said first representation, if said selected sub-object is de-selected. It then can be switched between said second representation of a selected sub-object and said first representation.

According to the present invention, content of selected sub-objects shown in said second representation may be zoomed by a first zoom factor. Thus in addition to said presentation of said sub-objects in said first and second representation, a further option to increase or decrease the scale of content of sub-objects may be offered.

According to the present invention, said zooming by said first zoom factor may be performed for content in all sub-objects that are presented. Thus when zooming content of a selected sub-object, also content in neighboring sub-objects may be zoomed by the same zoom factor.

According to the present invention, content of sub-objects shown in said first representation may be zoomed by a second zoom factor. The value and the range of this zoom factor may be the same as that of said first zoom factor, or be different, for instance, value and/or range may be adapted to said first representation.

According to the present invention, if said at least one selected sub-object shown in said second representation is shown with at least one sub-object in said first representation at the same time, and if then at least one of said at least one sub-objects shown in said first representation is selected, said newly selected at least one sub-object may be shown in said second representation, and at least said formerly selected sub-object may be shown in said first representation.

According to the present invention, after a selection of said at least one active sub-object, a display may be positioned to show as much of the content of said at least one selected sub-object as possible.

According to the present invention, a top edge of said at least one selected sub-object may be positioned essentially at a top edge of a display, and/or in horizontal direction left edges or right edges or center points of said selected sub-object and said display may be essentially scrolled to the same horizontal position.

According to the present invention, elements inside said at least one selected sub-object shown in said second representation may be selectable. Said elements may for instance be links, hyperlinks, forms or similar elements that can be selected.

According to the present invention, said at least one object may obey the Hypertext Markup Language HTML format or a derivative thereof. Such a derivative may for instance be the extensible HTML (XHTML) format or any other markup language.

According to the present invention, said at least one object may obey the Virtual Reality Markup Language VRML format or a derivative thereof.

According to the present invention, said step of at least partially dividing said at least one object (or parts thereof) into a plurality of sub-objects may comprise element-wise rendering elements contained in said at least one object to obtain a rendered object with maximum dimensions, checking if a size of said rendered object exceeds a threshold, and forming an sub-object from said rendered object if said threshold is exceeded. Said elements may, for instance, be HTML elements of one or more HTML pages. Said elements may, for instance, be rendered by determining corresponding pixel values under the assumption that said elements are to be shown in their original layout, so that said rendered object is represented by said pixel values. Said size of said rendered object may, for instance, be the number of pixels contained in said rendered object. Said sub-object may, for instance, be formed by setting said sub-object equal to said rendered object.

According to the present invention, said step of at least partially dividing said at least one object into a plurality of sub-objects may further comprise checking if edges of said formed sub-object cut other elements, and forming a smaller sub-object from said rendered object if other elements are cut. Said sub-object may, for instance, be iteratively reduced until no element contained in it is cut any more.

According to the present invention, said step of at least partially dividing said at least one object into a plurality of sub-objects may further comprise checking if at least one edge of said formed sub-object is not straight, and forming a smaller sub-object from said rendered object if at least one edge is not straight.

According to the present invention, said step of at least partially dividing said at least one object into a plurality of sub-objects may further comprise checking if a formed sub-object can be combined with a previously formed sub-object, and combining said formed sub-object and said previously formed sub-object if they can be combined.

According to the present invention, sub-objects may be combined if they have similar width, are horizontally similarly positioned and if their combined size does not exceed a threshold.

According to the present invention, said step of at least partially dividing said at least one object into a plurality of sub-objects may further comprise checking if a formed sub-object has to be re-sectioned, and re-sectioning said formed sub-object if it has to be re-sectioned. Said re-sectioning may comprise forming a new sub-object, which is smaller than the presently formed sub-object.

According to the present invention, a formed sub-object may have to be re-sectioned if its size exceeds a first threshold or if its size falls below a second threshold.

According to the present invention, said at least partial dividing of said at least one object into a plurality of sub-objects may be based on structures defined by said markup language, for instance table cells and/or paragraphs and/or frames of a 2D object, or 3D elements such as for instance blocks of a 3D object.

According to the present invention, in said at least partial dividing of said at least one object into a plurality of sub-objects, a form element may be assigned as a whole to one sub-object. A form element may for instance comprise a plurality of input fields, selection buttons and text that are aligned to each other, so that it may be advantageous not to further divide the form.

It should be noted that there are alternative ways and variations of the present invention which will be evident to a skilled person in the art and can be implemented without deviating from the scope and spirit of the appended claims. In particular, the present invention is by no means restricted to application in hand-held devices with small displays, it may equally well be applied in all types of scenarios where content has to be presented in a clear and structured way. It is readily seen that, for the same reasons as stated above, the present invention shall by no means be limited to HTML pages or VRML objects. Any other format for the definition of 2D or 3D content, such as word processing or editing formats such as for instance "*.doc", "*.rtf" or "*.pdf" or image formats such as for instance "*.jpg", "*.gif", "*.ps" or "*.pdf" or similar formats may be used.

The invention claimed is:

1. A method comprising: at least partially dividing at least one object into a plurality of sub-objects; causing presentation of said plurality of sub-objects in a first representation, determining at least one sub-object of said plurality of sub-objects to be made an active sub-object; making said at least one sub-object of said plurality of sub-objects an active sub-object; and in response to a user operation on said at least one active sub-object, causing presentation of at least one of said at least one active sub-objects in a second representation, wherein said at least partially dividing at least one object into a plurality of sub-objects comprises element-wise rendering elements contained in said at least one object to obtain a rendered object with a height, a width, and a depth, checking if a product of the height, the width, and the depth size of said rendered object exceeds a threshold, and forming one or more parallelepiped from said rendered object in an instance in which said threshold is exceeded.

2. The method according to claim 1, wherein said at least one object and said sub-objects are 3D-objects.

3. The method according to claim 1, wherein said at least one object is a page, and wherein said sub-objects are areas.

4. The method according to claim 1, wherein in said user operation, at least one of said at least one active sub-objects is selected, and wherein at least said selected sub-object is presented in said second representation.

5. The method according to claim 1, wherein at least two sub-objects of said plurality of sub-objects are made active sub-objects.

6. The method according to claim 1, wherein said at least partial division of said at least one object into said plurality of sub-objects is based on a structure of at least a part of said at least one object.

7. The method according to claim 1, wherein said at least partial division of said at least one object into said plurality of sub-objects is based on a sectioning algorithm.

8. The method according to claim 1, wherein in said first representation, at least one sub-object of said plurality of sub-objects is scaled to a size that is smaller than the original presentation size of said respective sub-object.

9. The method according to claim 1, wherein in said first representation, at least one sub-object of said plurality of sub-objects is cropped.

10. The method according to claim 1, wherein in said first representation, at least one sub-object of said plurality of sub-objects is indicated by an icon.

11. The method according to claim 1, wherein sub-objects of said plurality of sub-objects with a size that is above a size threshold, or that contain an amount of information that is above an information threshold are made active sub-objects, or both.

12. The method according to claim 1, wherein at least one of said at least one active sub-objects is automatically focused, or selected according to a selection criterion, or both.

13. The method according to claim 1, wherein in said second representation, said at least one active sub-object is scaled to a size that is larger than its size in said first representation.

14. The method according to claim 1, wherein within at least one of said sub-objects presented in said first representation, elements can be directly selected by a user.

15. The method according to claim 1, wherein said plurality of sub-objects is composed of different types of sub-objects, and wherein at least one group of sub-objects of a second type is associated with at least one sub-object of a first type.

16. The method according to claim 15, wherein said at least one active sub-object that is present in said second representation is said at least one sub-object of said first type, and wherein in response to a further user operation on said at least one sub-object of said first type, said at least one group of sub-objects of said second type associated with said at least one sub-object of said first type is presented.

17. A device for presenting at least a part of an object, comprising: means for at least partially dividing at least one object into a plurality of sub-objects; means for causing presentation of said plurality of sub-objects in a first representation; means for determining at least one sub-object of said plurality of sub-objects to be made an active sub-object; means for making said at least one sub-object of said plurality of sub-objects an active sub-object; and means for causing presentation of at least one of said at least one active sub-objects in a second representation, wherein said means for at least partially dividing at least one object into a plurality of sub-objects comprises means for element-wise rendering elements contained in said at least one object to obtain a rendered object with a height, a width, and a depth, means for checking if a product of the height, the width, and the depth Nee of said rendered object exceeds a threshold, and means for forming one or more parallelepiped from said rendered object in an instance in which said threshold is exceeded.

18. The device according to claim 17, wherein said sub-objects are presented on a display of a portable electronic device.

19. An apparatus comprising at least one processor and at least one memory including computer program code, the at least one memory and the computer program code configured to, with the at least one processor, cause the apparatus to perform: at least partially divide at least one object into a plurality of sub-objects; cause presentation of said plurality of sub-objects in a first representation; determine at least one sub-object of said plurality of sub-objects to be made an active sub-object; make said at least one sub-object of said plurality of sub-objects an active sub-object; and in response to a user operation on said at least one active sub-object, cause presentation of at least one of said at least one active sub-objects in a second representation, wherein said at least partially dividing at least one object into a plurality of sub-objects comprises element-wise rendering elements contained in said at least one object to obtain a rendered object with a height, a width, and a depth, checking if a product of the height, the width, and the depth size of said rendered object exceeds a threshold, and forming one or more parallelepiped from said rendered object in an instance in which said threshold is exceeded.

20. The apparatus according to claim 19, further configured to check if at least one edge of at least one or more said formed parallelepiped is not straight, and forming a smaller parallelepiped from said rendered object if at least one edge is not straight.

21. A computer program product comprising at least one non-transitory computer-readable storage medium having computer-executable program code instructions stored therein, the computer-executable program code instructions comprising: program code instructions for at least partially dividing at least one object into a plurality of sub-objects; program code instructions for causing presentation of said plurality of sub-objects in a first representation; determining at least one sub-object of said plurality of sub-objects to be made an active sub-object; program code instructions for making said at least one sub-object of said plurality of sub-objects an active sub-object; and in response to a user operation on said at least one active sub-object, program code instructions for causing presentation of at least one of said at least one active sub-objects in a second representation, wherein said program code instructions for at least partially dividing at least one object into a plurality of sub-objects comprises program code instructions for element-wise rendering elements contained in said at least one object to obtain a rendered object with a height, a width, and a depth, program code instructions for checking if a product of the height, the width, and the depth size of said rendered object exceeds a threshold, and program code instructions for forming one or more parallelepiped from said rendered object in an instance in which said threshold is exceeded.

22. The computer program product of claim 21, further comprising program code instructions for checking if at least one edge of at least one or more said formed parallelepiped is not straight, and program code instructions for forming a smaller parallelepiped from said rendered object if at least one edge is not straight.

* * * * *

UNITED STATES PATENT AND TRADEMARK OFFICE
CERTIFICATE OF CORRECTION

PATENT NO. : 8,302,029 B2
APPLICATION NO. : 12/152270
DATED : October 30, 2012
INVENTOR(S) : Mäkelä

Page 1 of 1

It is certified that error appears in the above-identified patent and that said Letters Patent is hereby corrected as shown below:

In the Specification

Column 2,
Line 60, "maybe" should read --may be--.

In the Claims

Column 22,
Claim 1, Line 53, "depth size of" should read --depth of--.

Column 23,
Claim 17, Line 60, "depth Nee of" should read --depth of--.

Column 24,
Claim 19, Lines 20 and 51, "depth size of" should read --depth of--.

Signed and Sealed this
Fourth Day of June, 2013

Teresa Stanek Rea
*Acting Director of the United States Patent and Trademark Office*